United States Patent [19]

Hirz et al.

[11] Patent Number: 5,413,284
[45] Date of Patent: May 9, 1995

[54] METHOD OF AND APPARATUS FOR TREATING PLASTERBOARD-PRODUCTION SCRAP

[75] Inventors: Harri Hirz, Hauneck; Horst Sterr, Paderborn, both of Germany

[73] Assignees: Babcock BSH Aktiengesellschaft Vormals Buttner-Schilde-Haas, Krefeld; Gebruder Lodige Maschinenbaugesellschaft MbH, Paderborn, both of Germany

[21] Appl. No.: 178,314
[22] PCT Filed: Jul. 21, 1992
[86] PCT No.: PCT/EP92/01659
§ 371 Date: Jan. 10, 1994
§ 102(e) Date: Jan. 10, 1994
[87] PCT Pub. No.: WO93/02984
PCT Pub. Date: Feb. 18, 1993

[30] Foreign Application Priority Data

Jul. 27, 1991 [DE] Germany .............. 41 24 984.4

[51] Int. Cl.⁶ .............................................. B02C 19/12
[52] U.S. Cl. .................................... 241/15; 241/17; 241/27; 241/29; 241/DIG. 38
[58] Field of Search .............. 241/101.8, 42, 199.12, 241/15, 16, 17, 23, 27, 29, DIG. 38

[56] References Cited

U.S. PATENT DOCUMENTS

| | | | |
|---|---|---|---|
| 277,319 | 5/1883 | Miller | 241/101.8 |
| 2,943,800 | 7/1960 | Wultsch | 241/42 |
| 3,027,102 | 3/1962 | Lodige et al. | 241/101.8 |
| 4,214,376 | 7/1980 | Lucke et al. | 34/10 |
| 4,413,790 | 1/1983 | Lipp | 241/101.8 |
| 4,801,101 | 1/1989 | Dreyer et al. | 241/240 |
| 4,807,817 | 2/1989 | Schoewe | 241/100 |
| 4,848,919 | 7/1989 | Lipp et al. | 366/295 |
| 4,860,960 | 8/1989 | Schwarz | 241/89.3 |
| 5,018,673 | 5/1991 | Eirich et al. | 241/62 |
| 5,100,063 | 3/1992 | Bauer | 241/14 |
| 5,183,213 | 2/1993 | Knez, Jr. | 241/24 |
| 5,238,195 | 8/1993 | Knez, Jr. | 241/24 |

FOREIGN PATENT DOCUMENTS

| | | |
|---|---|---|
| 0073864A1 | 3/1983 | European Pat. Off. |
| 0163963A2 | 12/1985 | European Pat. Off. |
| 0304604A2 | 3/1989 | European Pat. Off. |
| 2396941 | 2/1979 | France . |
| 1102534 | 3/1961 | Germany . |
| 2730941C2 | 7/1977 | Germany . |
| 367379 | 3/1963 | Switzerland . |

Primary Examiner—John Husar
Attorney, Agent, or Firm—Herbert Dubno

[57] ABSTRACT

A method of treating plasterboard production scrap wherein the pieces of the plasterboard scrap having the plaster attached to paper components, is passed through an apparatus which comprises a cylindrical housing in which radial arms carry ploughshares riding along the wall of the vessel and cutting heads are provided between the paths of the ploughshares. The apparatus so reduces the pieces that a homogeneous mixture of fibers of the paper components and granular gypsum is formed. This product mixed with raw gypsum provides a calcinable mixture which can be calcined for use in producing additional plasterboard.

14 Claims, 1 Drawing Sheet

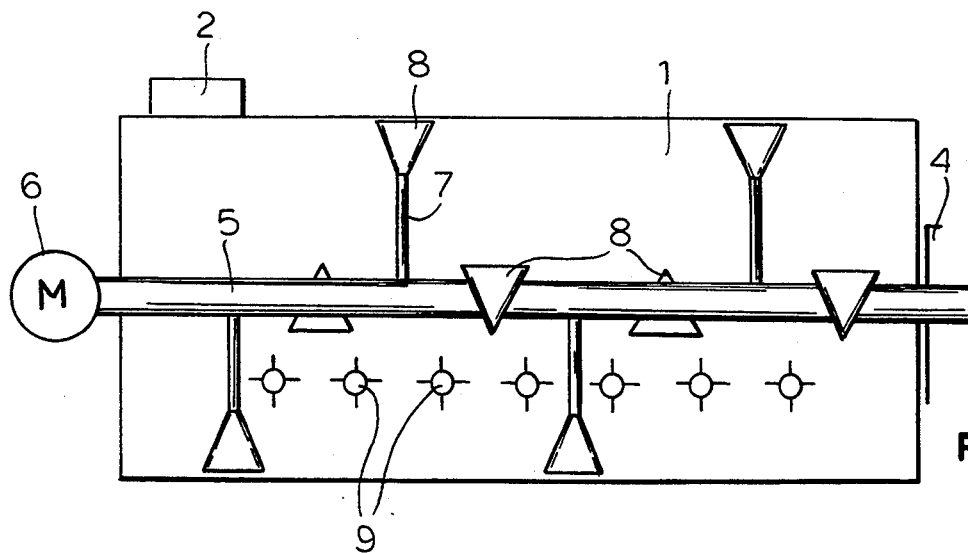
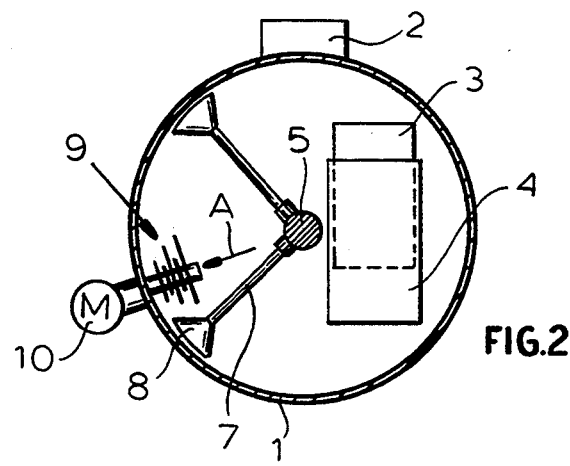
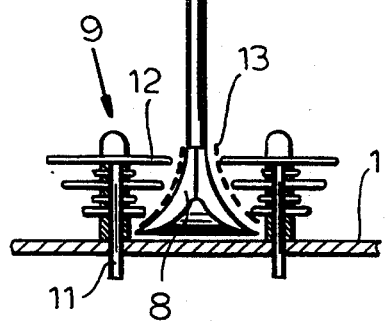
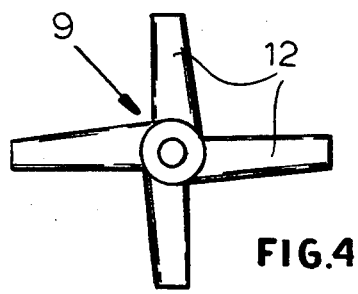
FIG.1
FIG.2
FIG.3
FIG.4

METHOD OF AND APPARATUS FOR TREATING PLASTERBOARD-PRODUCTION SCRAP

CROSS REFERENCE TO RELATED APPLICATIONS

This application is a national phase of PCT/EP 92/01659 filed Jul. 21, 1992 and based upon German application P 41 24 984.4 filed Jul. 27, 1991 under the International Convention.

FIELD OF THE INVENTION

The invention relates to a method of treating plasterboard production scrap using a mixing, granulating and drying device, consisting essentially of a horizontal cylindrical container with a feeding chute and a discharge opening, a therein supported drivable shaft, plowshare-like mixing tools fastened to the shaft by means of radial arms and reaching close to the container walls, and of drivable cutting heads mounted to the container walls, which are rotatable about radial axes and are fitted to the enveloping surface swept by the mixing tools.

BACKGROUND OF THE INVENTION

A detailed description of the device used by the invention can be found in German Patent 27 30 941. The device is intended for the treatment of powdery, fibrous, pasty or pulpy goods and for the drying of the resulting granulate. Two different embodiments of the cutting heads are indicated therein. In the first embodiment, several rectilinear blades of various lengths are fastened to a shaft in several superimposed planes. In the second embodiment, the blades are bent upwards at their ends. As a result of the cooperation between the plowshare-like mixing tools and the cutting heads, the material is supposed to be pressed, in order to produce granulates, which can then be further condensed by the mechanical action of subsequently used tools.

The invention, however, has nothing whatsoever in common with the described use of the known device of the mentioned patent specification.

In the production of plasterboard, there is always a certain quantity of scrap which cannot be sold, consisting basically of damaged boards or boards which do not meet standards. The scrap results partially right after setting and partially during the drying of the boards. In the first case it contains 30 to 40% humidity, in the second case the scrap material is practically absolutely dry. The quantity of scrap material differs from manufacturer to manufacturer; as a rule it ranges between 2 and 8% of the produced amount and in extreme cases reaches even 10%.

In practice the scrap material is reintroduced into the production process. For this purpose, the boards are at first roughly preshredded. The preshredded material is a mixture of gypsum crumbs and of cardboard shreds up to the size of a palm, with clinging gypsum residues. In the most widely used plasterboards with a specific weight (area weight) of approximately 8 kg/m$^2$ the paper content ranges between 4.5 and 5%, in plates with a specific weight of 11 kg/m$^2$ between 3.4 and 3.8%. Up to now a separation of paper and gypsum—even, through screening,—which can possibly through screening—which can satisfy the practical requirements has not yet been technologically implemented.

The roughly preshredded goods cannot be processed by the usual calcinators. For instance in an indirectly heated rotary calcinator, the paper shreds can float on top of the gypsum grains and form clusters which cannot be reliably discharged and can clog the calcinator. There is also the danger when dry paper remains in the calcinator while it is emptied, that it can trigger an explosion when the calcinator is restarted.

Also the roughly preshredded material has been fed already together with fresh gypsum to a mill. Under certain propitious conditions, the natural gypsum crumbs having an approximate size of up to 30 mm cause a certain further shredding of the paper shreds, but this is not always sufficient. When finely granulated flue gas gypsum or chemical gypsum are used as the raw material, a satisfactory further shredding cannot be achieved. Therefore this method has not been practical heretofore.

SUMMARY OF THE INVENTION

According to the invention, the known device described in the introduction is used for the treatment of the roughly preshredded scrap material resulting from the production of plasterboards.

The intermediate product obtained this way is a finely shredded, homogeneous material, completely free of agglomerates, which together with finely granulated raw gypsum can be further treated in a calcinator, without separating the paper components from the gypsum.

In tests conducted with representative samples of material it has been found that even after an average dwell time of 3 minutes, the paper components have been widely shredded to fibers and homogeneously mixed with the gypsum, so that they can be used in calcinators without any problem. After an average dwell time of 6 minutes, according to the method of pneumatic size analysis, grain spectra have been obtained, which when sampled have shown that 90% of the material has a grain size of less than 1 mm. Grain sizes exceeding 5 mm did not occur.

In an embodiment the average dwell time in the device to be used according to the invention is kept very short and after that an additional homogenization is performed in a further mixer. The fine shredding and the mixing of the individual components are thereby performed in two separate systems.

Preferably the humidity content of the used material is limited to a maximum of 10%. This can be done for instance by mixing dry and wet scrap material or by admixing dry gypsum.

Further it is also possible to predry the roughly preshredded material.

Advantageously the possibility to dry the material indirectly or directly during treatment is provided.

When the starting material is too dry, it can be advantageous to spray in water through nozzles.

In a preferred embodiment of the invention the prepared material is admixed to the raw gypsum prior to calcination in an approximate maximum amount of 20%. Higher quantities can lead to disturbances in the setting process, due to the possibility that the treated material might contain additives, such as setting accelerators or retardants, adhesives and substances contained in the paper. According to the conditions existing in individual cases, a mixing proportion of 10 parts treated material to 90 parts raw gypsum should not be surpassed. At a content of 10% of treated material, the total mixture prepared for calcination has a paper content of 0.4 to 0.5%. This proportion has no negative influence at all on the calcination, the subsequent process steps and the quality of the final product.

In a further advantageous development of the invention, the rough preshredding of the board scraps takes place in the area of the feeding chute, which for this purpose can be for instance shaped like a funnel and equipped with spiked rollers.

In order to be used according to the invention, the device can be operated continuously, quasi-continuously or discontinuously.

BRIEF DESCRIPTION OF THE DRAWING

The above and other objects, features, and advantages will become more readily apparent from the following description, reference being made to the accompanying drawing in which:

FIG. 1 is a schematic longitudinal section through the apparatus;

FIG. 2 is in its left half a cross section and in its right half an end view of the apparatus, seen from the discharge side;

FIG. 3 is a diagrammatic detail showing the positioning of the cutting head's relation to the mixing tool; and FIG. 4 is an end view of a cutting head in the direction A of FIG. 2.

A horizontal cylindrical container 1 has a feeding chute 2 and a discharge outlet 3 with a height-adjustable slide gate 4. The container wall can also be designed over its entire length or only over part of it as a double shell for the introduction of a heating medium. The device can also have connections for supply air and spent air, as well as spray nozzles for water, which are not shown in the drawing.

Within the container 1 a shaft 5 is axially supported and can be driven by a motor 16. On the shaft 5, at equal distances, several radial arms 7 are arranged in an angularly offset manner to carry plowshare-like mixing tools 8 which reason close to the container walls.

Between each two mixing tools 8 several cutting heads 9 are mounted on the container wall. These cutting heads are rotatable about radial axes and can be driven by drive 10. The cutting heads 9 are arranged—as indicated in FIG. 1—in at least one axially parallel row, preferably in two rows in the lower half of the container 1.

The plowshare shape of the mixing tool is only represented in FIG. 1 and FIG. 2, but can be clearly seen in FIG. 3.

Each cutting head 9 has a drive shaft 11. Several flat blades 12 which—arranged on top of each other, alternately offset at right angles—are fastened centrally on the drive shaft 11. The length of the blades 12 increases with the distance from the inner container wall, so that the points of blades 12 lie on a curve 13, which is so fitted to the side flank of the mixing tools 8 and thereby to the enveloping surface brushed that it lies approximately in the enveloping surface or envelope swept by these tools.

During operation, the rotational speed of the shaft 5 is selected so that the material to be processed is finely shredded as well as mixed in the mechanically created fluidized bed. As a rule this occurs in a Froude number range between 1 and 7. The Froude number is $Fr = (n/n_c)^2$, where n is the rotational speed of the shaft 5 and $n_c$ is the critical rotational speed. The cutting heads 9 rotate with a number of rotations between 1000 and 5000 per minute. The required average dwelling time is predetermined by setting the slide gate 4.

The device illustrated in the drawing is a continuously operated machine with tools which in a short time finely shred and homogeneously mixes the material in the container.

We claim:

1. A method of treating plasterboard-production scrap, comprising the steps of:
  (a) transforming pieces of plasterboard-production scrap consisting of paper components attached to gypsum components into a homogeneous mixture of fibers of said paper components and granular gypsum, by:
    introducing pieces of said plasterboard-production scrap consisting of paper components attached to gypsum components into a generally horizontal cylindrical container having a plurality of axially spaced and angularly offset radial arms carried by a central shaft, plowshare-shaped mixing tools on said radial arms sweeping close to an inner surface of the container, and cutting heads on a wall of said container each having a generally radial shaft carrying a multiplicity of cutting blades of increasing radial length inwardly from the wall so that said blades sweep close to envelopes generated by said mixing tools as said central shaft is rotated, and
    rotating said shafts while maintaining said scrap in said container for a dwell time sufficient to reduce said pieces substantially to a homogeneous mixture of fibers of said paper components and granular gypsum;
  (b) mixing said scrap with granular raw gypsum to produce a calcinable mixture; and
  (c) calcining said calcinable mixture.

2. The method defined in claim 1 wherein said scrap is mixed with raw gypsum in an amount such that said scrap makes up up to 20% of the mixture and said raw gypsum makes up at least 80% of the mixture.

3. The method defined in claim 2 wherein the dwell time of said scrap in said container is controlled to be between 3 and 12 minutes.

4. The method defined in claim 2 wherein the dwell time of said scrap in said container is controlled to be between 2 and 7 minutes, further comprising the step of homogenizing said mixture of fibers and granular gypsum in a homogenizer separate from said container.

5. The method defined in claim 2, further comprising the step of heating said wall.

6. The method defined in claim 2, further comprising the step of spraying water into said container during step (a).

7. The method defined in claim 2, further comprising supplying said container with drying air during step (a).

8. The method defined in claim 2 wherein said raw gypsum is added to said scrap in said container.

9. The method defined in claim 2 wherein said scrap is mixed with raw gypsum in an amount such that said scrap makes up up to 10% of the mixture and said raw gypsum makes up at least 90% of the mixture.

10. The method defined in claim 2, further comprising the step of effecting a rough shredding of said pieces at an inlet to said container.

11. The method defined 2, further comprising the step of limiting a moisture content of the scrap introduced into said container to an average humidity of 10%.

12. The method defined in claim 11 wherein the moisture content of the scrap introduced into said container is limited to an average humidity of 10% by mixing wet and dry scrap.

13. The method defined in claim 11 wherein the moisture content of the scrap introduced into said container is limited to an average humidity of 10% by mixing dry granular raw gypsum with wet scrap.

14. The method defined in claim 11 wherein the moisture content of the scrap introduced into said container is limited to an average humidity of 10% by drying said scrap.

* * * * *